WATCH CALENDAR MECHANISM

Original Filed Oct. 29, 1965 3 Sheets-Sheet 1

INVENTOR
DONALD W. BRASHEAR

BY Le Blanc and Shur
ATTORNEYS

WATCH CALENDAR MECHANISM

Original Filed Oct. 29, 1965 3 Sheets-Sheet 2

INVENTOR
DONALD W. BRASHEAR
BY LeBlanc and Nolan
ATTORNEYS

WATCH CALENDAR MECHANISM

Original Filed Oct. 29, 1965 3 Sheets-Sheet 3

INVENTOR
DONALD W. BRASHEAR
BY LeBlanc and Shur
ATTORNEYS

United States Patent Office

Re. 27,278
Reissued Jan. 18, 1972

27,278
WATCH CALENDAR MECHANISM

Donald W. Brasher, Lancaster, Pa., assignor to Hamilton Watch Company, Lancaster, Pa.

Original No. 3,353,348, dated Nov. 21, 1967, Ser. No. 505,658, Oct. 29, 1965. Application for reissue Oct. 23, 1969, Ser. No. 869,977
Int. Cl. G04b *19/24*
U.S. Cl. 58—58 19 Claims

Matter enclosed in heavy brackets [ ] appears in the original patent but forms no part of this reissue specification; matter printed in italics indicates the additions made by reissue.

ABSTRACT OF THE DISCLOSURE

The calendar timepiece has a calendar ring continuously driven from a dial train as to advance $1/31$ of a revolution during each 24 hour period of watch operation. A shutter mechanism is continuously driven by a cam wheel in the dial train such that the shutter continuously follows advancing indicia on the calendar ring for twenty-four hours, whereupon a cam follower portion on the spring-biased shutter mechanism moves so that the shutter snaps back to the next following date and immediately begins to follow movement of the next date on the calendar ring. A two-position stem is provided which declutches the shutter mechanism from the dial train upon longitudinal movement of the stem from one position to another so that the calendar ring can be set in either direction by rotation of the stem.

The present invention relates to calendar timepieces, and more particularly to an improved watch-calendar mechanism particularly suited for use in electric watches.

Many calendar-timepiece systems exist in which the movement of the watch or like timepiece is provided with a date-bearing indicia ring or calendar ring operated in timed relation to the hour wheel of the timepiece so as to indicate successive dates. In typical existing calendar-watch systems, the dial side of the movement is provided with a calendar ring or disc that is rotatably mounted below the dial and bears 31 equally spaced numbers which are successively exposed through a window in the dial as the ring is advance $1/31$ of a revolution each twenty-four hours by a mechanism interconnecting the calendar ring with the dial train of the watch.

In most of these systems the dial train is effectively disconnected from the calendar indicia ring or disc for about twenty-one hours, with the appropriate date number on the calendar ring being exposed through a window in the watch dial to indicate the date. In the remaining three-hour period the dial train is in driving engagement with the calendar ring, usually through a camming gear, so as to cause the calendar ring to advance $1/31$ of a revolution. The calendar ring is thus progressively moved in the remaining three-hour period (which is usually around midnight) until the next date number is beneath the aforementioned dial window. The next date number is exposed for approximately twenty-one hours and is thereafter replaced by the following successive number when the calendar ring is again drivingly engaged with the dial train by the intermediate drive mechanism and thus displaced.

Most existing calendar-watch drive mechanisms impose a quite high load on the source of power driving the dial train, and this load is more than existing electric-watch systems can bear with a compact, long-lived battery power source. Also, due to the relatively high power requirements of these prior watch-calendar systems, they present problems with so-called automatic or self-winding spring driven watches when these watches are not in the full-wound state. In many cases additional disadvantages exist, including the fact that the date ring can be turned in only one direction by manual operation of the usual crown and stem provided for setting the watch, whereby prolonged operation of the stem is necessary to turn the calendar ring to expose a lower date number through the dial window.

In assignee's United States Patent No. 3,240,006, granted Mar. 15, 1966, there is disclosed an improved calendar timepiece overcoming many of the disadvantages of the earlier constructions. In the watch-calendar mechansim of the aforesaid copending application, a calendar date ring is continuously engaged with and driven by a dial train for a twenty-four hour period rather than for a short period like three hours each date, thereby reducing the power per hour for operating the date ring to a fraction (e.g. $1/8$) of that required for prior watch systems. In addition, the date number of that watch is entirely exposed through the watch dial window for a complete twenty-four-hour period, with a novel shutter arrangement providing an instantaneous date advance at or near midnight. Setting of the date ring in either direction is permitted.

While the watch of that application has proved very satisfactory and has significantly reduced the power necessary to drive the calendar mechanism, some wearers have objected to the fact that the calendar mechanism does not always operate exactly at the stroke of twelve midnight.

The present invention is directed to an improved calendar-timepiece mechanism which retains all the advantages of the structure set forth in the above-mentioned copending application, yet at the same time provides a simplified, inexpensive date mechanism which changes over in a reliable manner at or very near midnight of each date. As in assignee's previous construction, the date ring of the present invention is continuously driven through the watch gearing and this continuous drive is employed in conjunction with a shutter mechanism which is tripped to change the displayed date in a simple, efficient, effective and reliable manner at or very close to midnight of each twenty-four-hour day. An additional important feature of the present invention is the provision of a simple, inexpensive and reliable mechanism by which the date may be manually set in either direction through a simple manipulation of the watch-hand setting stem and crown.

It is therefore one object of the present invention to provide an improved calendar timepiece.

Another object of the present invention is to provide an improved electric calendar watch.

Another object of the present invention is to provide improved drive and setting mechanisms for an electcric calendar watch.

Another object of the present invention is to provide an improved shutter trip mechanism for calendar watches.

Another object of the present invention is to provide a novel and improved calendar-watch system incorporating a gear-driven date or calendar ring and cooperating shutter arrangement which is simple, compact, and of trouble-free construction.

In the present invention, the calendar ring is provided with internal teeth and is continuously driven from the dial train of the watch so as to advance $1/31$ of a revolution during each twenty-four-hour period of watch operation. Also provided is an improved shutter mechanism similarly continuously driven by a cam wheel in the dial train such that the shutter continuously follows the movement of the advancing indicia on the calendar ring. At or close to the exact stroke of midnight, a cam-follower portion of the shutter mechanism moves under the influence of a return spring from the radially outermost portion to the radially innermost portion of the dial-train-driven cam, so that the shutter substantially instantaneously snaps back to the next following date and again immediately begins to follow the movement of the next date on the calendar ring.

An additional important feature of the present invention resides in the provision of a simplified and novel assembly for accurately and reliably setting the calendar ring to the desired date. This mechanism operates in conjunction with the cam-driven shutter and includes a conventional two-position watch setting stem which in a first position permits the watch to run in a normal manner but when set into a second position engages the dial train so that rotation of the setting stem by manual manipulation thereof, moves the gears of the dial train to set the hands of the watch in either direction. Connected at one end to the setting stem is a pivoted lever which carries at its other end a pin. During normal operation of the watch mechanism with the setting stem in the first position such that the setting or crown gear of the stem is disengaged from the dial train, the lever pin is silghtly spaced from the calendar shutter. However, when the setting stem is moved into the second position in engagement with the dial train for setting the watch hands, the lever mechanism is pivoted about its support such that the pin which it carries bears against the shutter so as to move the cam-follower portion of the shutter away from its driving cam. In this position the shutter is completely disengaged from the dial train, and rotation of the setting stem not only acts to set the watch hands through manual rotation of the dial-train gears but, at the same time, makes it possible to set the calendar ring in either direction through this same dial-stem rotation because of the fact that the dial train is in continuous driving engagement with the internal gear of the calendar ring.

These and further objects and advantages of the present invention will be more apparent upon reference to the following specification, claims, and appended drawings, wherein:

FIGURE 2 is a partial plan view of a portion of the watch structures of FIGURES 1a–1c, illustrating the novel calendar-ring drive mechanism and shutter assembly of the present invention corresponding to the 12:01 a.m. position of the watch hands illustrated in FIGURE 1a;

Figure 7:
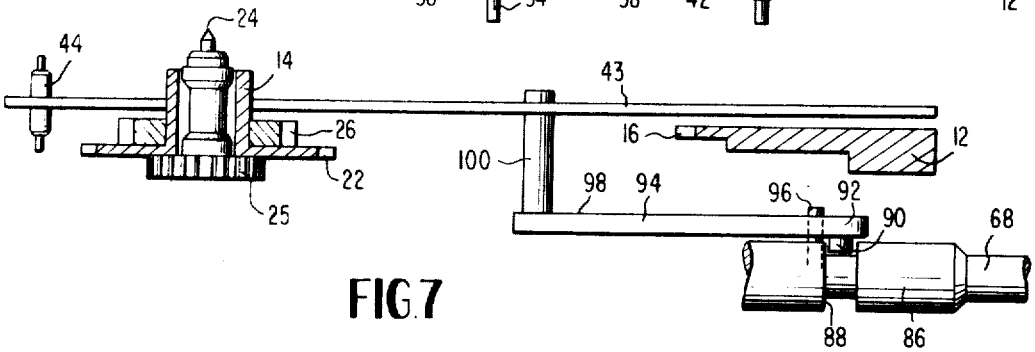
Figure 5:
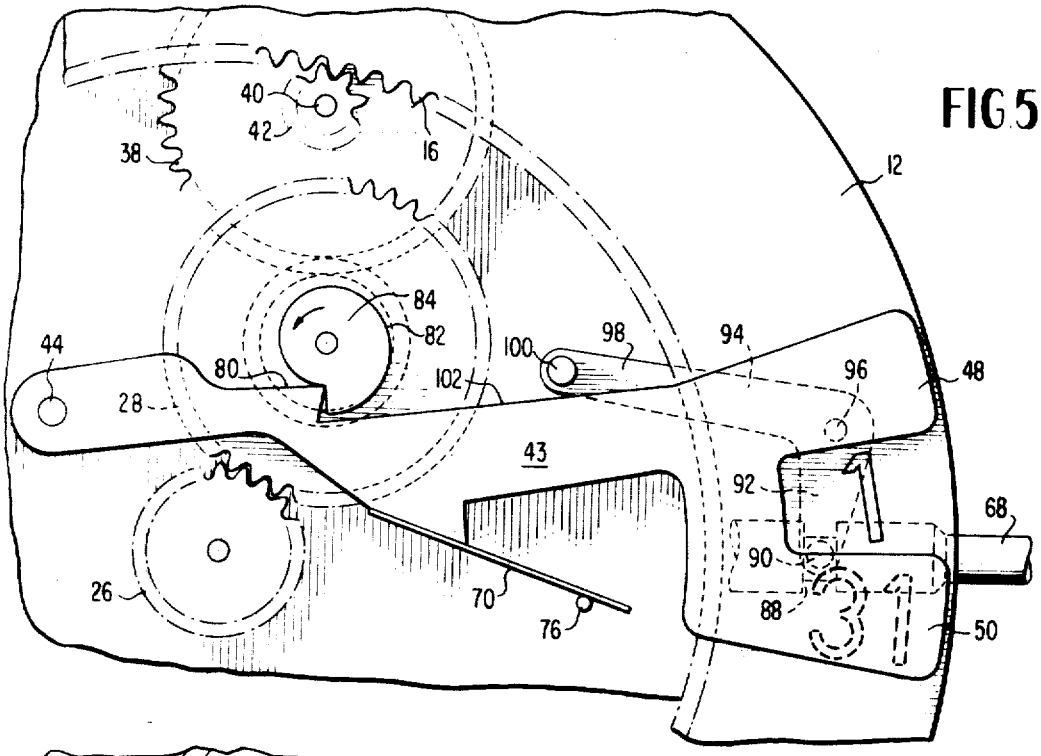
FIGURE 5 is a partial plan view with parts in phantom illustrating the setting mechanism of the present invention in a first or normal position where the watch freely runs with the setting mechanism disengaged from the gear train.
Figure 6:
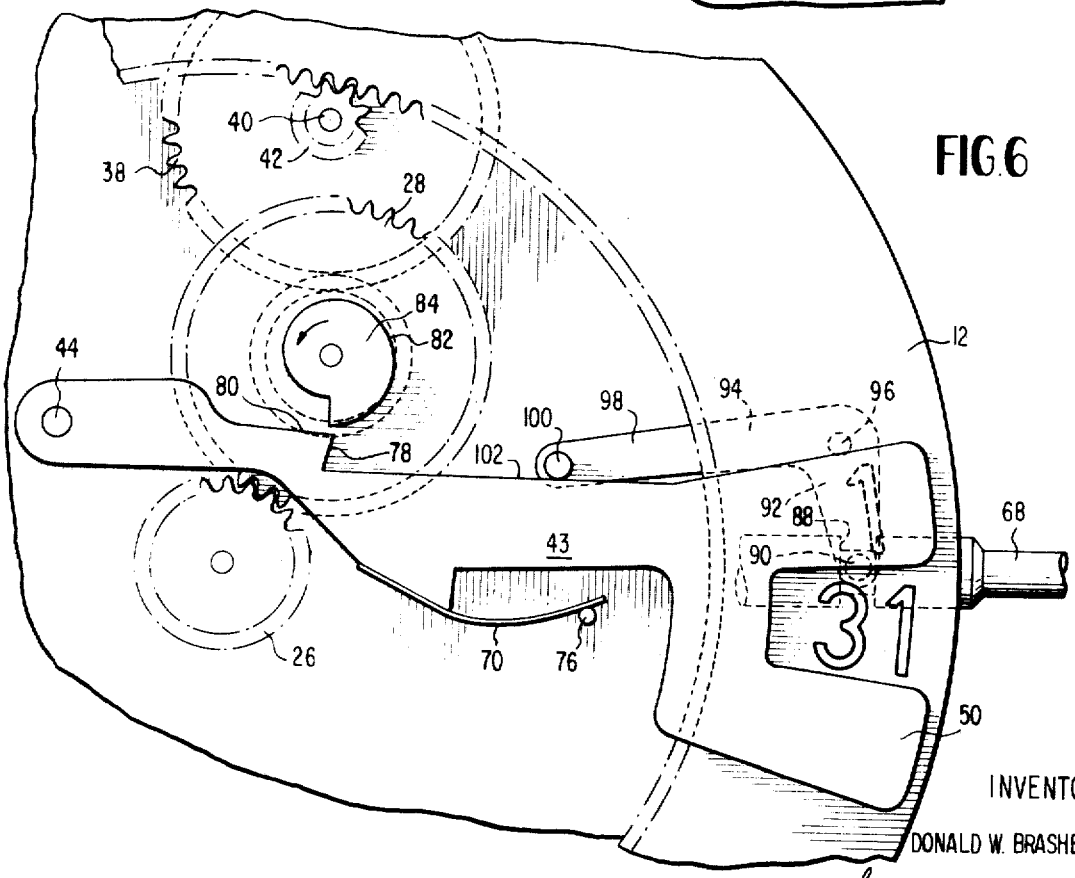

FIGURE 6 is a view similar to that of FIGURE 5, with the setting stem in a second position and the shutter unclutched or disengaged from its drive cam so that the watch hands and calendar ring may be manually set in either direction by rotation of the setting stem; and FIGURE 7 is a partial vertical cross section through the assembly of FIGURES 5 and 6, showing the clutch lever and setting stem connection.

Referring to the drawings, the reference numeral 10 generally indicates a watch which may be any presently commercially available watch having a movement of suitable design. By way of example only, the movement may be that used in the Model 505 electric watch of the Hamilton Watch Company, Lancaster, Pa., disclosed in Hamilton Service Bulletin No. 220, but modified to incorporate the watch-calendar system of this invention as hereinafter set forth. Alternatively, the watch may be of the more recent type identified as Hamilton Electric Watch Model 510.

Figure 1A:
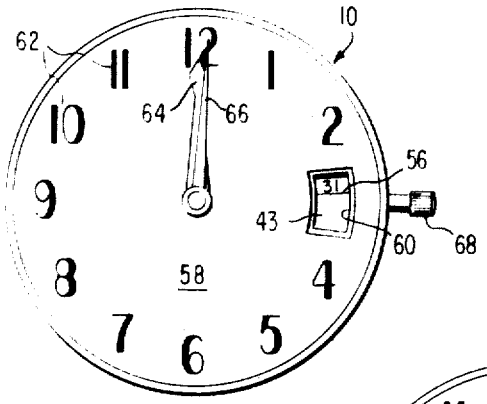
FIGURE 1a shows the dial face of an electric watch incorporating the new improved calendar system of the present invention as it appears at 12:01 a.m. on the thirty-first day of the month.
Figure 1B:
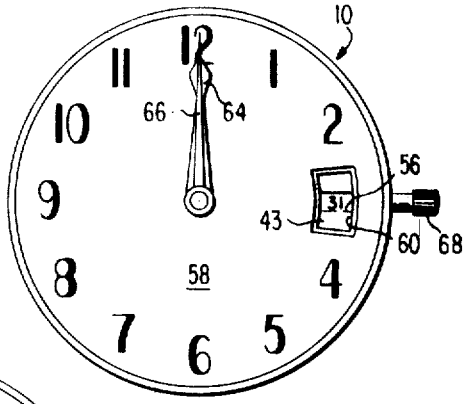
FIGURE 1b is an illustration of the watch dial face similar to that of FIGURE 1a, showing how it appears at high noon on the thirty-first day of the month.
Figure 1C:
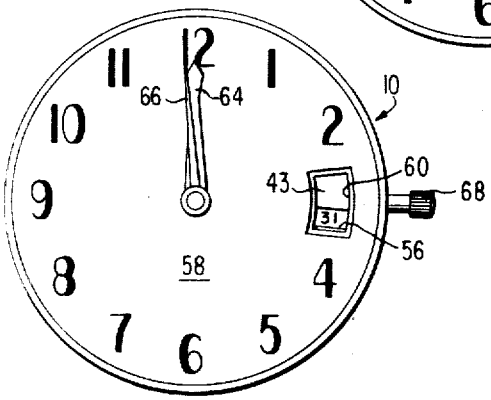
FIGURE 1c is an illustration of the watch dial face similar to FIGURES 1a and 1b, showing how it appears at 11:59 p.m. on the thirty-first day of the month.
Figure 4:
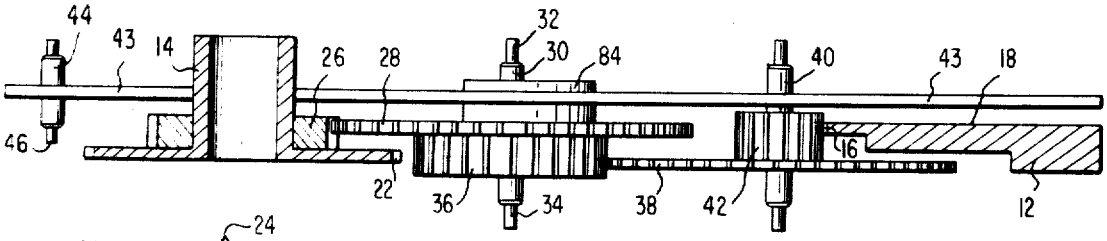
FIGURE 4 is a composite vertical cross section through a portion of the dial train, illustrating the continuous-drive connection for the calendar ring.
Figure 2:
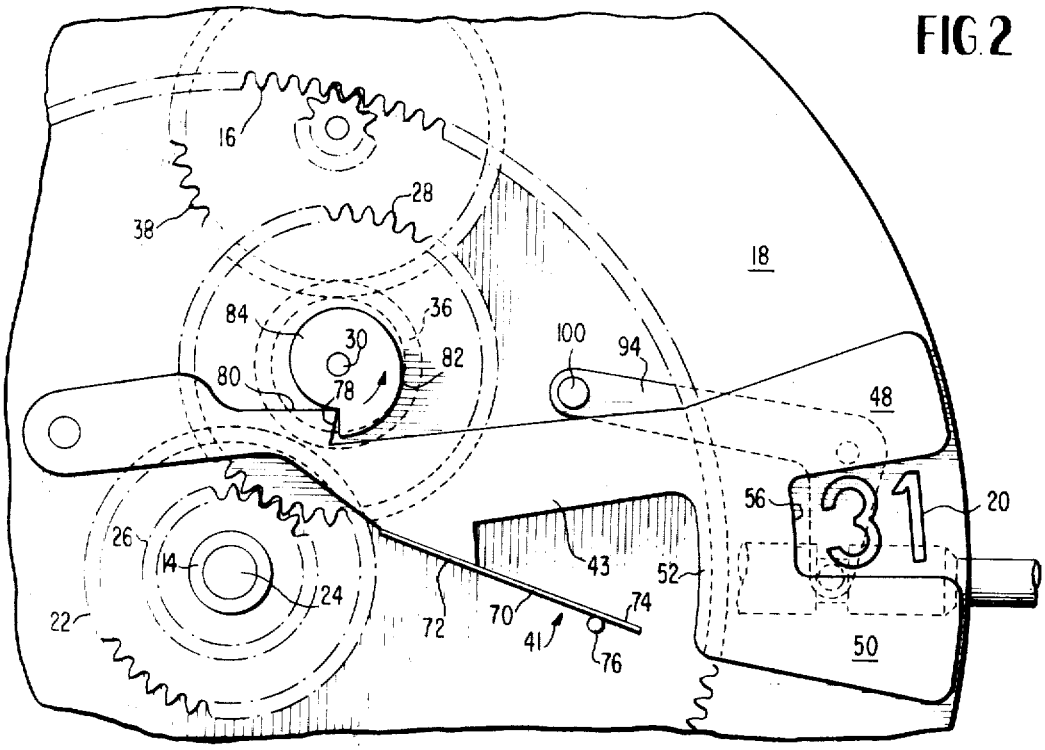
Figure 3:
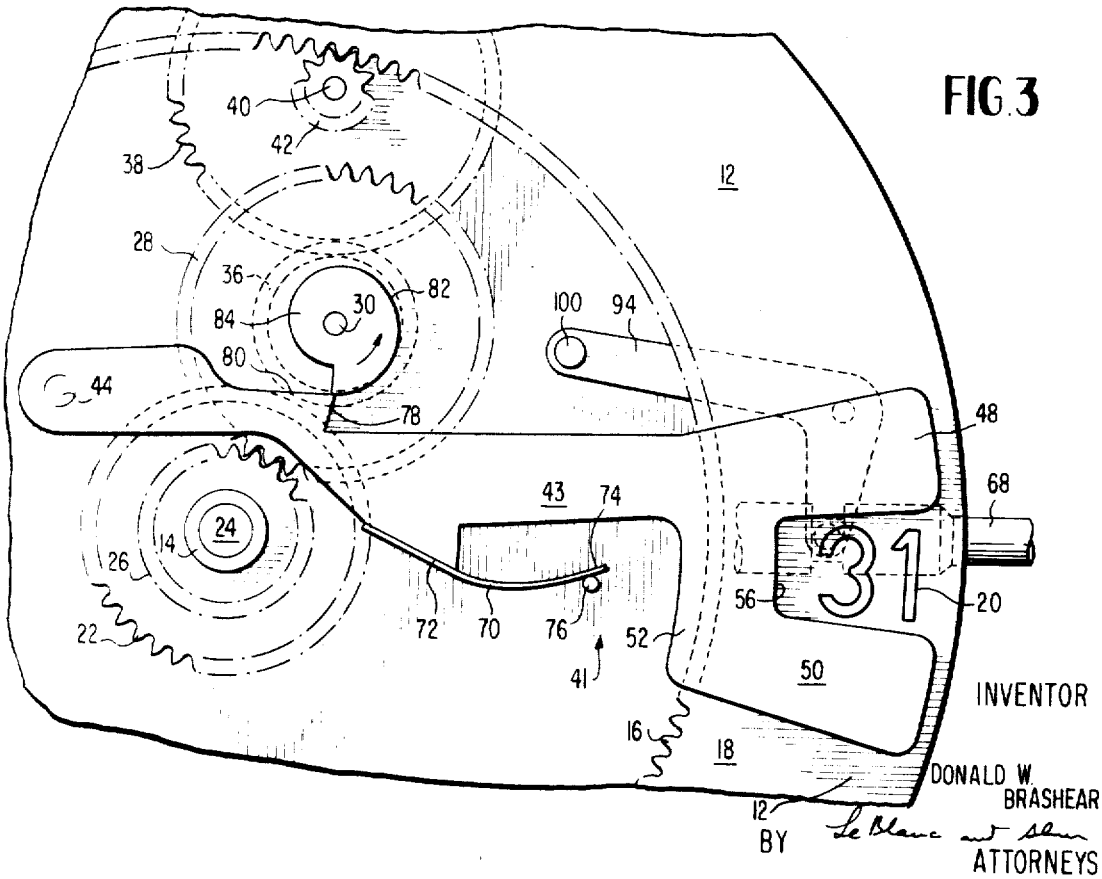
FIGURE 3 is a view similar to FIGURE 2, with the drive mechanism and shutter mechanism moved to the 11:59 p.m. position corresponding to the position of the watch hands illustrated in FIGURE 1c.

The watch movement of the present invention may be of the type disclosed in the aforementioned copending application S.N. 227,160, filed Oct. 1, 1962, and includes, as best seen in FIGURES 2 through 4, a calendar ring 12 mounted between the dial side of a pillar plate and a dial train bridge (neither of which are shown). The pillar plate and dial train bridge provide a track for the calendar ring 12 whereby the calendar ring is rotatable about the axis 24 of a center wheel or hour wheel 14 of the watch. For a more detailed discussion of the mounting arrangement for calendar ring 12 reference may be had to the aforementioned copending application S.N. 227,160, which is incorporated herein by reference. The annular indicia-carrying ring 12 is provided along its inner edge with gear teeth 16 of uniform size and shape, which teeth are equally spaced over the entire inner periphery of the calendar ring. The calendar ring 12 is further provided on its upper face 18 with thirty-one equally spaced numerals 20 numbered successively from 1 to 31.

Center wheel 14 is the hour wheel of the watch and is coupled to the remainder of the watch dial train in a conventional manner by the hour-wheel gear 22. That is, the hour wheel 14 is coupled to the remaining portions of the watch train through the gear 22 in the conventional manner and makes one complete revolution every twelve hours. The central axis of the watch movement is indicated at 24 in FIGURE 4 as passing through the center of the hour wheel, and this also forms the central rotational axis for the calendar ring 12. The hands of the watch are driven from the dial train in the usual manner and the dial train is concentric with a cannon pinion 25 provided for this purpose, as illustrated in FIGURE 7.

Hour wheel 14 is concentric with a calendar drive pinion 26 which is coupled to an intermediate gear 28 mounted on a staff 30. The ends 32 and 34 of the staff 30 are received in suitable jewel bearings mounted in stationary portions of the watch movement so that the intermediate gear 28 rotates with the staff 30. Also carried by staff 30 is an intermediate pinion 36 which meshes with the teeth of a calendar gear 38 similarly mounted for rotation with a second similar staff 40. Rotatably mounted staff 40 also carries a calendar pinion 42 having teeth meshing with the internal teeth 16 of the calendar ring 12 such that rotation of pinion 42 with its rotatably mounted staff 40 drives the calendar ring 12 by way of teeth 16. The step-down ratio of the gear coupling between hour wheel 14 and calendar ring 12 is such that the calendar ring 12 makes $\frac{1}{31}$ of a revolution about the central watch movement axis 24 during each twenty-four-hour period that the watch runs. Pinion 42 at all times engages the teeth 16 of the calendar ring so that the calendar ring is continuously driven from the watch movement and, more specifically, from the hour wheel 14 by way of the intermediate and drive gears and pinions described.

The calendar watch of this invention also includes a shutter assembly, generally indicated at 41 in FIGURE 2, which cooperates with the date ring 12 so that a certain date numeral 20 is entirely exposed for a twenty-four-hour period, at the end of which time the next successive date numeral is instantaneously exposed in a manner now to be explained.

Shutter assembly 41 includes a shutter 43 of elongated configuration, which shutter is pivotally mounted on a rotatable staff 44 to pivot about the pivot axis indicated at 46 in FIGURE 4. The shutter is provided with a pair of fingers 48 and 50 joined by a base portion 52, which fingers are spaced to define a shutter window 56 for ex-continuous calendar-ring drive, is the provision of a novel simplified and inexpensive arrangement for manually setting the calendar ring in either direction to the desired date. This is accomplished through the action of a simple clutch in the form of a pivoted lever member connected to the conventional two-position setting stem of the electric watch, which lever acts to lift the cam-follower portion of the shuter free of the cam during periods when the watch hands, and hence the calendar ring, are being reset to the desired position. This system completely obviates the necessity for sometimes advancing the calendar ring through as much as almost an entire month, which is the case with some systems wherein the calendar ring may only be set in a single direction. Again, the calendar-ring setting mechanism is of simple, inexpensive and reliable construction and does not significantly add to the cost, number of components, or space required in the watch structure.

While the invention has been described in conjunction with small battery-powered electric watches, it is apparent that the calendar mechanism of the present invention is applicable to all types of watches, clocks and other timepieces. It finds particular utility in timepiece systems wherein the available power is limited, and which for this reason advantageously employ a continuous drive to the calendar ring, with its accompanying substantial reduction in required power. Furthermore, it is possible to modify the stem 68 to provide three positions—i.e., separate hand and calendar-ring setting positions in addition to the normal running position—so that the calendar ring can be manually set without turning the watch hands.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed and desired to be secured by United States Letters Patent is:

1. In a calendar timepiece, the improvement comprising rotatable calendar means having data indicia thereon, means for continuously rotating said calendar means having a window overlying a portion of said calendar means, cam means operably connected to said calendar rotating means for movement relative to said calendar means and arranged in controlling relation to said shutter means for moving said shutter means in synchronism with said calendar means during substantially all of each 24-hour period and clutch means engageable against said shutter means for disengaging said shuter means from said cam means during setting of said calendar means.

2. In a calendar timepiece, the improvement comprising a calendar ring having date indicia thereon, means in said timepiece for continuously driving said calendar ring at a rate of $1/31$ of a revolution per day, shutter means pivotally mounted in said timepiece and having a window overlying a portion of said calendar ring, a continuously-driven rotatable cam in said timepiece operably connected to said calendar ring drive means for movement relative to said calendar ring, and means resiliently urging said shutter against said cam whereby said shutter pivots to follow the movement of said calendar ring during each day.

3. A calendar timepiece comprising a timepiece movement having an hour wheel, a calendar ring bearing a series of date indicia rotatably mounted on said movement, means for continuously rotating said calendar ring in proper timed relation to said hour wheel, a shutter having a window overlying a portion of said calendar ring, a single rotatable cam on said movement bearing against said shutter for advancing said shutter within an indicium on said calendar ring during the greater portion of each day, and means for continuously rotating said cam in proper timed relation to said hour wheel such that said cam completes one revolution for each twenty-four revolutions of said hour wheel.

4. A calendar timepiece comprising a timepiece movement having an hour wheel, a calendar ring bearing a series of date indicia rotatably mounted on said movement, a shutter pivoted in said timepiece and having a window overlying a portion of said calendar ring, means for continuously rotating said calendar ring in proper timed relation to said hour wheel, said means including internal gear teeth on said calendar ring and a gear train having a proper reduction ratio interconnecting said calendar-ring gear teeth and said hour wheel, a rotatable cam in said timepiece, gear means coupling said hour wheel and said cam for continuously driving said cam in proper timed relation to said calendar ring, said cam having a convolute cam surface with a stepped portion joining the radially innermost and outermost portions of said cam surface, and means resiliently urging said shutter against said cam surface.

5. A calendar timepiece comprising a calendar ring having a series of date indicia thereon, means in said timepiece for continuously driving said calendar ring at a rate of one revolution every thirty-one days, a shutter pivoted in said timepiece and having a window overlying a portion of said calendar ring, a single rotatable cam in said timepiece bearing against said shutter, said cam having a cam surface curved to pivot said shutter such that said window follows an indicium on said calendar ring for one day and then pivots back to the next indicium, and means in said timepiece for driving said cam in synchronism with said calendar ring.

6. In a calendar timepiece, the improvement comprising a calendar ring having date indicia thereon, means in said timepiece for continuously driving said calendar ring at a rate of $1/31$ of a revolution per day, shutter means pivotally mounted in said timepiece and having a window overlying a portion of said calendar ring, a continuously-driven rotatable cam in said timepiece, and means resiliently urging said shutter against said cam whereby said shutter pivots to follow the movement of said calendar ring during each day; said cam being provided with a convolute cam surface joined by a stepped portion whereby at the end of each calendar day said shutter moves over said stepped portion and returns to its initial position.

7. A calendar timepiece comprising a timepiece movement having an hour wheel, a calendar ring bearing a series of date indicia rotatably mounted on said movement, means for continuously rotating said calendar ring in proper timed relation to said hour wheel, a shutter having a window overlying a portion of said calendar ring, a rotatable cam on said movement bearing against said shutter for advancing said shutter with an indicium on said calendar ring during the greater portion of each day, and means for continuously rotating said cam in proper timed relation to said hour wheel; said continuous rotating means including gearing on said calendar ring and a gear train having a proper reduction ratio interconnecting said calendar ring and said cam with said hour wheel.

8. A calendar timepiece comprising a timepiece movement having an hour wheel, a calendar ring bearing a series of date indicia rotatably mounted on said movement, means for continuously rotating said calendar ring in proper timed relation to said hour wheel, a shutter having a window overlying a portion of said calendar ring, a rotatable cam on said movement bearing against said shutter for advancing said shutter with an indicium on said calendar ring during the greater portion of each day, and means for continuously rotating said cam in proper timed relation to said hour wheel; said timepiece including a setting stem and clutch means operative upon longitudinal movement of said setting stem to disengage said shutter from said cam.

9. In a calendar timepiece, the improvement comprising a rotatable calendar [means] *ring* having date indicia thereon, means for continuously driving said calendar [means] *ring* at a rate such that it advances one indicia per day, shutter means having a window overlying a portion of said calendar [means] *ring* and means operably connected to said calendar rotating means for movement relative to said calendar [means] *ring* and arranged in controlling relation to said shutter means for moving said shutter means in synchronism with said calendar [means] *ring* during substantially all of each day, cam follower means on said shutter means, and means coupled to said shutter means resiliently urging said cam follower means against said cam means.

10. A device according to claim 9 including a setting stem and means responsive to longitudinal movement of said setting stem for disengaging said cam-follower means from said cam means.

11. In a calendar timepiece, the improvement comprising a calendar ring having date indicia thereon, means in said timepiece for continuously driving said calendar ring at a uniform speed, a shutter having a window at one end overlying a portion of said calendar ring, means pivotally mounting the other end of said shutter in said timepiece, a continuously-driven rotatable cam in said timepiece, said cam having a convolute cam surface with a stepped portion joining the radially innermost and outermost portions of said cam surface, and means resiliently urging said shutter against said cam surface.

12. A device according to claim 11 including means for driving said cam in synchronism with said calendar ring whereby said window advances with an indicium on said calendar ring until said shutter passes over said stepped portion of said cam surface from said radially outermost portion to said radially innermost portion.

13. A device according to claim 12 including a setting stem in said timepiece, a lever pivotally mounted in said timepiece and having one end coupled to said setting stem, the other end of said lever being movable into engagement with said shutter to remove said shutter from said cam surface.

14. A calendar timepiece comprising a calendar ring having a series of date indicia thereon, means in said timepiece for continuously driving said calendar ring at a rate of one revolution every thirty-one days, a shutter pivoted in said timepiece and having a window overlying a portion of said calendar ring, a rotatable cam in said timepiece bearing against said shutter, said cam having a cam surface curved to pivot said shutter such that said window follows an indicium on said calendar ring for one day and then pivots back to the next indicium, means in said timepiece for driving said cam in synchronism with said calendar ring, a setting stem in said timepiece for setting said calendar ring, said setting stem having a run position and a set position, and means responsive to movement of said setting stem from said run to said set position for disengaging said shutter from said cam.

15. A timepiece according to claim 14 wherein said stem is rotatable to set both said calendar ring and the hands of said timepiece.

16. A timepiece according to claim 15 wherein said stem is longitudinally movable between said run and setting positions, and said disengaging means comprises a lever for lifting said shutter off said cam.

17. A calendar timepiece comprising a timepiece movement having an hour wheel, a calendar ring bearing a series of data indicia rotatably mounted on said movement, a shutter pivoted in said timepiece and having a window overlying a portion of said calendar ring, means for continuously rotating said calendar ring in proper timed relation to said hour wheel, said means including internal gear teeth on said calendar ring and a gear train having a proper reduction ratio interconnecting said calendar-ring gear teeth and said hour wheel, a rotatable cam in said timepiece, gear means coupling said hour wheel and said cam for continuously driving said cam in proper timed relation to said calendar ring, said cam having a convolute cam surface with a stepped portion joining the radially innermost and outermost portions of said cam surface, means resiliently urging said shutter against said cam surface, a rotatable setting stem in said timepiece longitudinally movable from a run to a setting position, and means responsive to longitudinal movement of said stem for disengaging said shutter from said cam.

18. A timepiece according to claim 17 wherein said stem is rotatable in either direction to set said timepiece.

19. A timepiece according to claim 18 wherein said disengaging means comprises a pivoted lever having one end coupled to said setting stem and its other end engageable with said shutter to lift said shutter off said cam surface.

References Cited

The following references, cited by the Examiner, are of record in the patented file of this patent or the original patent.

UNITED STATES PATENTS

| | | | |
|---|---|---|---|
| 3,240,006 | 3/1966 | Reese | 58—58 |
| 3,258,907 | 7/1966 | Hamblin | 58—58 |

FOREIGN PATENTS

| | | | |
|---|---|---|---|
| 702,989 | 1/1941 | Germany | 58—6 A |
| 296,400 | 2/1954 | Switzerland | 58—58 |

RICHARD B. WILKINSON, Primary Examiner

G. H. MILLER, Jr., Assistant Examiner

U.S. Cl. X.R.

58—5, 63

UNITED STATES PATENT OFFICE
CERTIFICATE OF CORRECTION

Patent No. RE. 27,278 Dated January 18, 1972

Inventor(s) Donald W. Brashear

It is certified that error appears in the above-identified patent and that said Letters Patent are hereby corrected as shown below:

Column 3, line 22, "silghtly" should read -- slightly --.
Column 5, after line 4, insert the attached sheet.

Signed and sealed this 5th day of December 1972.

(SEAL)
Attest:

EDWARD M.FLETCHER,JR.
Attesting Officer

ROBERT GOTTSCHALK
Commissioner of Patents